US011346468B1

(12) United States Patent
Waltman et al.

(10) Patent No.: US 11,346,468 B1
(45) Date of Patent: May 31, 2022

(54) ADJUSTABLE SUPPORT APPARATUS AND METHOD OF USE

(71) Applicant: Innovative Steel Works & Fabrication LLC, Rockvale, TN (US)

(72) Inventors: Greg Waltman, Rockvale, TN (US); William B. McDowell, Murfreesboro, TN (US)

(*) Notice: Subject to any disclaimer, the term of this patent is extended or adjusted under 35 U.S.C. 154(b) by 0 days.

(21) Appl. No.: 16/582,417

(22) Filed: Sep. 25, 2019

Related U.S. Application Data

(60) Provisional application No. 62/745,841, filed on Oct. 15, 2018, provisional application No. 62/736,841, (Continued)

(51) Int. Cl.
*F16M 11/00* (2006.01)
*E04B 9/00* (2006.01)
(Continued)

(52) U.S. Cl.
CPC ............. *F16L 3/20* (2013.01); *F16M 11/24* (2013.01); *E03F 5/04* (2013.01); *E04H 9/14* (2013.01);
(Continued)

(58) Field of Classification Search
CPC ....... F16L 3/20; F16M 11/24; F16M 2200/08; F16M 3/223; F16M 11/2085; E04H 9/14; E04F 15/0247; E04F 15/02452; E03F 5/04
See application file for complete search history.

(56) References Cited

U.S. PATENT DOCUMENTS 3,222,030 A * 12/1965 Thorpe ............. E04F 15/02452
254/100
5,819,482 A * 10/1998 Belke ........................ E04C 3/32
52/126.6
(Continued)

FOREIGN PATENT DOCUMENTS

CN  203549135 U  4/2014

OTHER PUBLICATIONS

Anchorage: Pipe Support Systems & Components. Anchorage-Group-Catalogue. Jun. 2020. Last accessed Oct. 28, 2021 from https://anchoragegroup.com.au/wp-content/uploads/2020/07/Anchorage-Revit-Content-User-Guide-by-IGS.pdf., 47 pages.
(Continued)

*Primary Examiner* — Tan Le
(74) *Attorney, Agent, or Firm* — Patterson Intellectual Property Law, P.C.; Ryan D. Levy (57) ABSTRACT

Apparatuses, systems, and methods for providing a support apparatus are provided. The support device may be a height-adjustable pipe support apparatus. A support apparatus may include a base having a threaded slug therein, a pad plate, a rod sleeve coupled to the pad plate, an adjustment rod coupled between the base and the rod sleeve, at least a portion of the adjustment rod being threadedly receivable by the rod sleeve and the threaded slug, the adjustment rod coupling the base and the pad plate, wherein a rotational movement of the adjustment rod is configured to adjust a distance between the base and the pad plate. A base plate may be coupled to the base and configured to couple to an external element.

12 Claims, 10 Drawing Sheets

Related U.S. Application Data filed on Sep. 26, 2018, provisional application No. 62/735,887, filed on Sep. 25, 2018.

(51) Int. Cl.
*F16M 11/24* (2006.01)
*F16L 3/20* (2006.01)
*E04H 9/14* (2006.01)
*E03F 5/04* (2006.01)

(52) U.S. Cl.
CPC ......... *F16M 11/00* (2013.01); *F16M 2200/08* (2013.01)

(56) References Cited

U.S. PATENT DOCUMENTS

| | | | | |
|---|---|---|---|---|
| 5,862,635 | A * | 1/1999 | Linse | E04H 9/14 52/126.6 |
| 6,347,489 | B1 * | 2/2002 | Marshall, Jr. | E02D 27/00 248/354.5 |
| 6,347,493 | B1 * | 2/2002 | Jette | H02G 3/285 248/49 |
| 6,442,906 | B1 * | 9/2002 | Hwang | E04F 15/0247 248/188.4 |
| 8,365,475 | B2 * | 2/2013 | Zlatar | E04F 15/02452 52/126.6 |
| 9,714,726 | B1 | 7/2017 | Laidley et al. | |
| 2016/0169442 | A1 | 6/2016 | Storjohann | |
| 2017/0102097 | A1 | 4/2017 | Walston et al. | |

OTHER PUBLICATIONS

E-Z Line Pipe Support Co., LLC: E-Z Line Adjustable Pipe Support Brochure, Last accessed Oct. 28, 2021 from https://www.ezline.com/ezline-adjustable-pipe-supports/, 1 page.

Heartland Pipe Support Systems: Heartland Pipe Support Systems Configurations Brochure, Last accessed Oct. 28, 2021 from http://www.jamesonsteel.com, 2 pages.

Piping Technology & Products, Inc.: Adjustable Pipe Saddle Support, Last accessed Oct. 28, 2021 from https://pipingtech.com/wp-content/uploads/2017/07/fig46-pipesaddle.pdf, 1 page.

Piping Technology & Products, Inc.: Pipe Saddle Support with U-Bolt, Last accessed Oct. 28, 2021 from https://pipingtech.com/wp-content/uploads/2017/07/fig48-pipesaddle.pdf, 1 page.

Vibro-Acoustics: SPS Seismic Pipe Stand (Fixed Height) and SPSA (Adjustable Height) Installation Instructions File No. INS-SPS-002, Last accessed Oct. 28, 2021 from https://virs.vibro-acoustics.com/wp-content/uploads/sites/9/INS-SPS.pdf, Jun. 8, 2012, 1 page.

* cited by examiner

ADJUSTABLE SUPPORT APPARATUS AND METHOD OF USE

A portion of the disclosure of this patent document contains material that is subject to copyright. The copyright owner has no objection to the authorized facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

This application claims benefit of U.S. Provisional Patent Application No. 62/735,887, dated Sep. 25, 2018, entitled "Support Apparatus," benefit of U.S. Provisional Patent Application No. 62/736,841, dated Sep. 26, 2018, entitled "Support Apparatus," and benefit of U.S. Provisional Patent Application No. 62/745,841, entitled "Skid Apparatus, System, and Method," dated Oct. 15, 2018, each of which is hereby incorporated by reference in its entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The construction of above ground piping with attached equipment, such as, but not limited to, filters, valves, regulators, and meters, requires support to prevent sagging and movement. Pipe supports can be mounted on a concrete pad or on a skid fabricated from structural steel. It is typical, depending on the industry, for annual inspections to be performed on the surface of the supported pipe to ensure satisfactory integrity of the pipe. However, existing pipe supports lack adjustability and configuration in relation to a skid.

BRIEF SUMMARY OF THE INVENTION

The present disclosure relates generally to a support apparatus, more particularly to a support apparatus for supporting an object such as a pipe. A pipe support such as a pipe stand may be coupled to a skid via one or more skid slots, and a height of the pipe stand may be adjusted by rotating a threaded adjustment rod, which may be threadedly received and/or coupleable by at least one of threaded slug of a base of the pipe stand and/or a rod sleeve of a pad plate of the pipe stand.

By utilizing an adjustable pipe support, inspections such as annual inspections can be performed without the need to cut the support and re-weld it back in place. The size of the pipe and necessary height the supports can often vary significantly.

One embodiment of the present disclosure provides a support apparatus including a base including a threaded slug therein, a pad plate, a rod sleeve coupled to the pad plate, an adjustment rod coupled between the base and the rod sleeve, at least a portion of the adjustment rod being threadedly receivable by the rod sleeve and the threaded slug, the adjustment rod coupling the base and the pad plate, wherein a rotational movement of the adjustment rod is configured to adjust a distance between the base and the pad plate, and a base plate coupled to the base, the base plate configured to couple to an external element.

A pad may be coupled to the pad plate, the pad may restrict or inhibit at least one of motion or vibration of an element in contact with the pad. The pad plate may include a plurality of through holes which may receive at least a portion of at least one coupler. The at least one coupler may be placed in contact between both a pipe and the pad plate. The base plate may include at least one slotted coupling section which may correspond to at least one opening of the external element. The support apparatus may couple to the external element using a fastener extending through the at least one slotted coupling section and the at least one opening of the external element. The at least one slotted coupling section may correspond to at least one skid slot of the skid.

A further embodiment of the present disclosure provides a system for providing adjustable support. The system includes a skid including a skid plate having at least one skid slot therethrough, and a support apparatus coupleable to the skid. The support apparatus includes a base including a threaded slug therein, a pad plate, a rod sleeve coupled to the pad plate, an adjustment rod coupled between the base and the rod sleeve, at least a portion of the adjustment rod being threadedly receivable by the rod sleeve and the threaded slug, the adjustment rod coupling the base and the pad plate, wherein a rotational movement of the adjustment rod is configured to adjust a distance between the base and the pad plate, and a base plate coupled to the base, the base plate configured to couple to the skid.

The support apparatus may further include a pad coupled to the pad plate which may restrict or inhibit at least one of motion or vibration of an element in contact with the pad. The pad plate may include a plurality of through holes configured to receive at least a portion of at least one coupler. The at least one coupler may be placed in contact between both a pipe and the pad plate. The base plate may include at least one slotted coupling section configured to correspond with the at least one skid slot. The support apparatus may couple to the skid using a fastener extending through the at least one slotted coupling section and the at least one skid slot.

A still further embodiment of the present disclosure provides a method of adjusting a skid-mountable pipe stand. The method begins by coupling the pipe stand to a skid. A position of the pipe stand may be translated along at least one skid slot of the skid. A height of a pad plate of the pipe stand may be adjusted relative to the skid by rotating an adjustment rod of the pipe stand to correspond to a height of a pipe received at the pad plate. Coupling the pipe stand to a skid may include providing a fastener between at least one coupling location of a base plate of the pipe stand and at least one skid slot of the skid. In embodiments where the fastener is at least one of a screw or a nut, the position of the pipe stand along the at least one skid slot of the skid may be moved along an opening of at least one of the at least one coupling location or at least one skid slot. A height of the pad plate of the pipe stand may be locked using a locking nut in contact with the adjustment rod and a body of the pipe stand. At least one of motion or vibration of a pipe in contact with a pad of the pad plate may be reduced and/or inhibited. A pad of the pad plate may be placed in contact with a pipe, and a coupler may be placed in contact with both the pad plate and the pipe Numerous other objects, features, and advantages of the present invention will be readily apparent to those skilled in the art upon a reading of the following disclosure when taken in conjunction with the accompanying drawings.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-10, various exemplary apparatuses and associated methods according to the present disclosure are now described in detail. Where the various figures may describe embodiments sharing various common elements and features with other embodiments, similar elements and features are given the same reference numerals and redundant description thereof may be omitted below.

Various embodiments of an apparatus according to the present invention may provide apparatuses, systems, and methods for providing a support apparatus.

Figure 1:
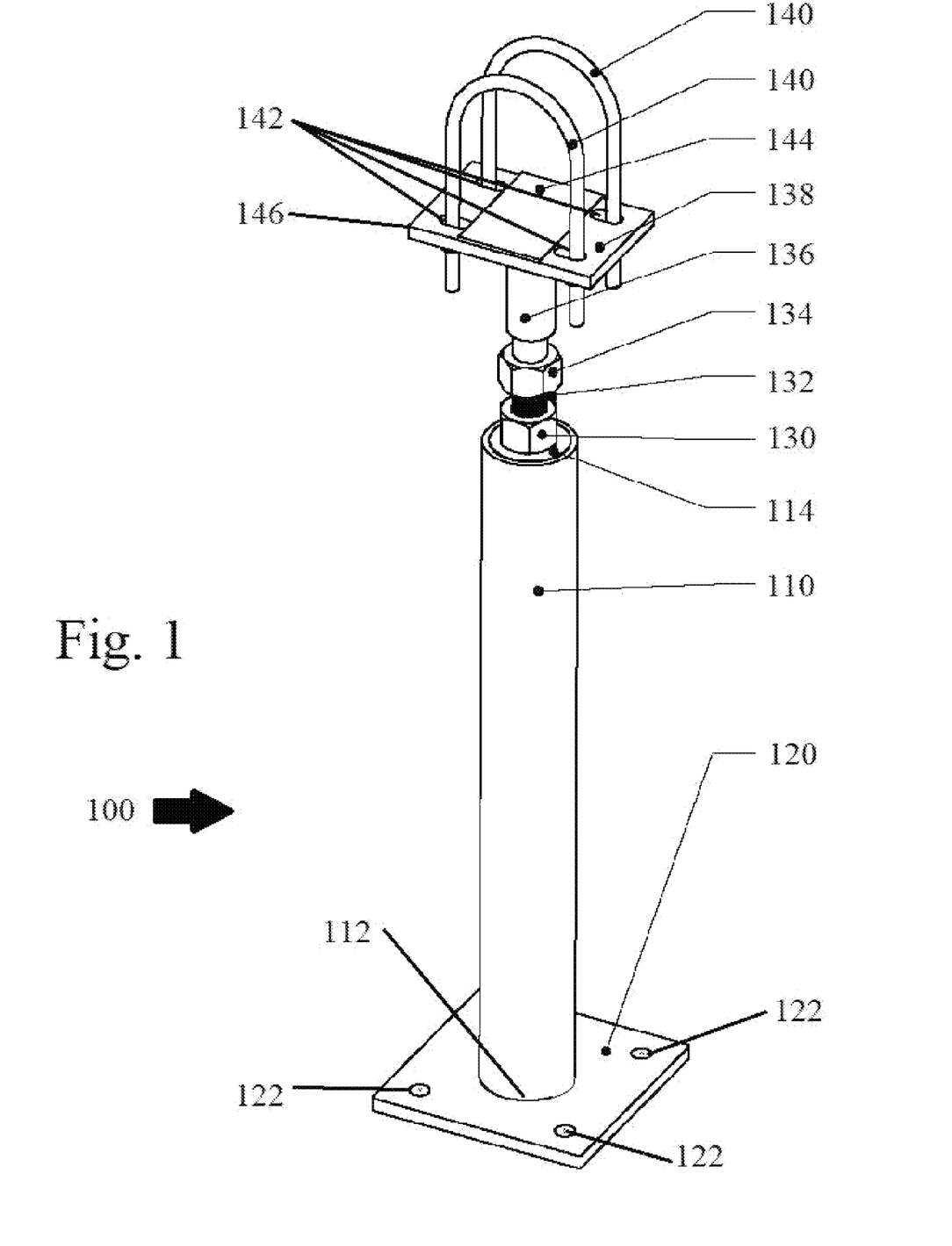
FIG. 1 illustrates a raised, front right side perspective view of an exemplary embodiment of a support apparatus according to aspects of the present disclosure.
Figure 2:
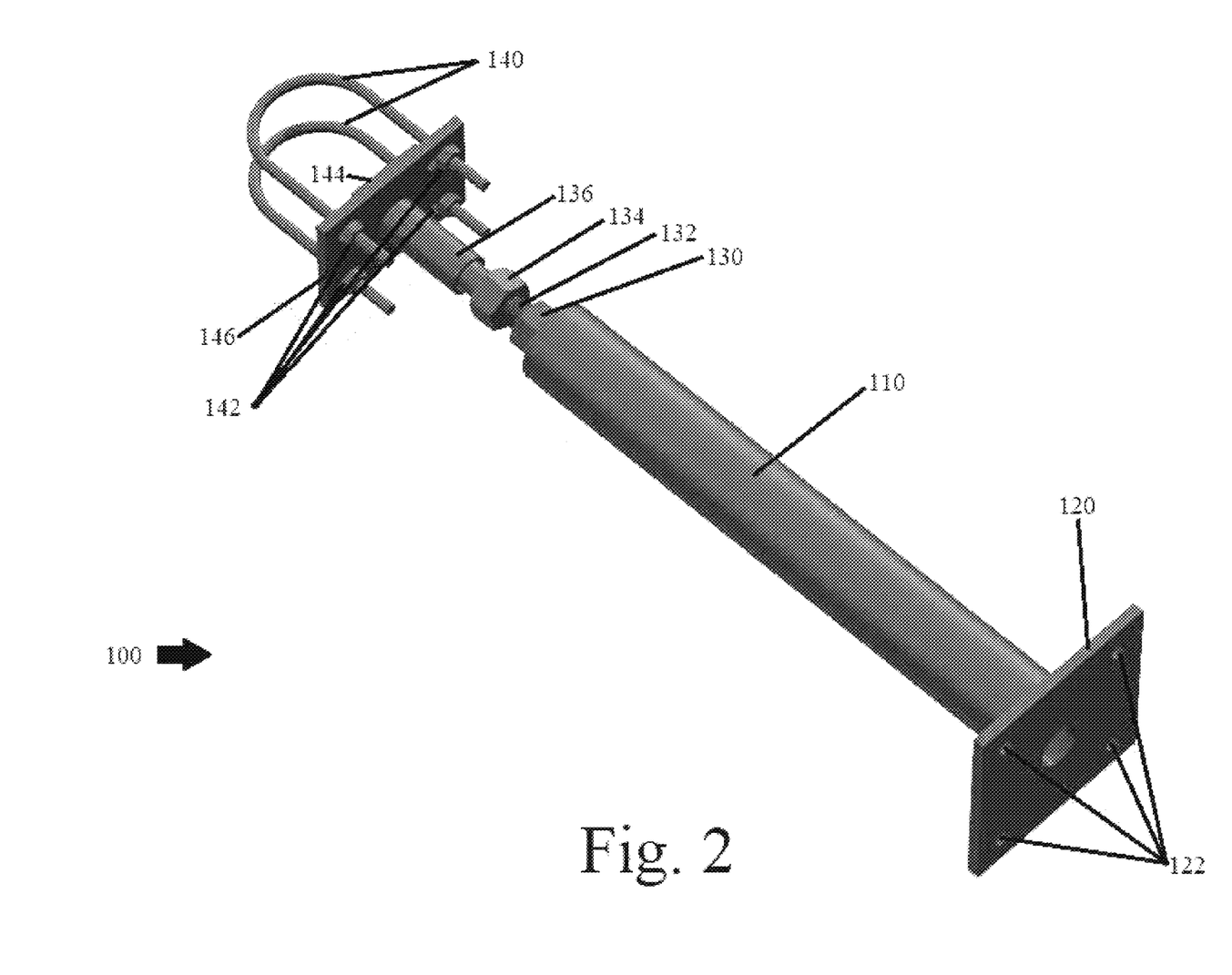
FIG. 2 illustrates a bottom, front-left perspective view of an exemplary embodiment of a support according to aspects of the present disclosure.

FIG. 1 illustrates a raised, front right side perspective view of a support apparatus according to an exemplary embodiment. FIG. 2 illustrates a bottom-left perspective view of a support according to an exemplary embodiment. As shown in FIGS. 1-10, in one exemplary embodiment, a support 100 includes a base 110 coupled to base plate 120 at a connection location 112. The base 110 has the shape of a cylinder in the embodiment illustrated in FIG. 1, but may additionally or alternative include at least, either in whole or in part, an elongated rectangle, an elongated triangle, or any other shape, number of edges, continuity, or type capable of coupling to the base plate 120. The base 110 is coupled to the base plate 120, for example, by welding, by at least one of the base 110 and the base plate 120 having a threaded section configured to be coupled to either the base 110 or the base plate 120 (or a coupler corresponding thereto), and/or may be pre-formed during manufacture. The base plate 120 may include at least one coupling location 122. A coupling location 122 may be a through hole or other absence of material permitting the base plate 120 to be coupled to an external element, such as a skid pad. Additionally or alternatively, at least one coupling location 122 may include a fastener or other element (not illustrated) configured to permit fastening of the base plate 120 to one or more external elements. In various embodiments, the support 100 may be a support stand, for example a pipe stand, configured to support at least one element at the base plate 120 (such as a pipe or other external element).

The support 100 may include an adjustment rod 132 coupleable between to a surface of the base 110 and a surface of the rod sleeve 136. The adjustment rod 132 may be fixedly and/or rotatably coupleable to the rod sleeve 136 and may be rotatably coupleable to the threaded slug 114. Although illustrated at a top end of the base 110 and a lower portion of the rod sleeve 136 (e.g., via the adjustment nut 134) in FIG. 1, the adjustment rod 132 may be coupleable to any exterior or interior surface of the base 110 and/or rod sleeve 136 without departing from the spirit and the scope of the present disclosure.

The threaded slug 114 may be placed within at least a portion of the base 110. Although described with reference to being threaded, at least a portion of the threaded slug 114 may be smooth, may have variable threading, or may have one or more other fastening or adjustment sections or materials included therein or coupleable thereto. In one exemplary embodiment, the threaded slug 114 may extend through an entire length of the base 110. A locking nut 130 may be coupled to the adjustment rod 132 and configured to set an elevation of the top plate surface relative to the base 110 via a position of the threaded slug 114, e.g., by restricting movement of the adjustment rod 132 relative to the threaded slug 114. The locking nut 130 may be configured to provide a locking function between the base 110 and the adjustment rod 132, and may create a setoff distance from the base 110 to at least one element coupled to the adjustment rod 132.

A rod sleeve 136 may be coupled to an adjustment nut 134, the adjustment nut 134 being coupleable to the adjustment rod 132. In various embodiments, the adjustment nut 134 may include at least one threaded portion at an interior or exterior surface configured to permit a height of the support 100 to be adjusted (e.g., by clockwise or counterclockwise movement of the adjustment rod 132 relative to the threaded slug 114. The adjustment rod 132 may be coupled to or otherwise connectable with an adjustment nut 134. The adjustment nut 134 may be threaded and configured to translate along a threaded surface of the adjustment rod 132 in one embodiment. The rod sleeve 136 may be coupled to a pad plate 146. The pad plate 146 may have a pad 144 coupled to a surface thereof. The pad 144 is configured in one embodiment as an anti-vibration pad configured to restrict or inhibit movement or vibration of an element in contact with the pad 144. The pad 144 may include at least a portion of Fabreeka material in various embodiments, although any vibration-reducing or other type of pad or material may be used without departing from the scope of the present disclosure.

The pad plate 146 may be configured with one or more through holes 142. One or more through hole 142 may be configured to receive at least a portion of a coupler 140 therethrough. One or more through holes 142 may have a movement restriction device coupleable thereto, for example a nut, configured to restrict movement of a coupler 140 therethrough. Although illustrated as having two couplers 140, it should be appreciated that various embodiments may include one or three or more couplers 140. Each coupler 140 may include any contact surface or enclosing member configured to prevent movement, restrict movement, or otherwise inhibit motion or movement of an element coupled thereto or there within. The coupler 140 is illustrated as a U-bolt in FIG. 1, but may be any connector, fastener, or material satisfying the above description of a coupler 140. In the embodiment illustrated by FIG. 1, two couplers 140 are used, the legs of each passing through a through hole 142 of the pad plate 146. In various embodiments, a locking nut or other fastening means may be used to secure one or more legs of the coupler 140 to the pad plate 146. The pad plate 146 may include a top surface 138.

One exemplary embodiment of the VersaSkid pipe support includes a top plate (e.g., pad plate 146) covered with a Fabreeka pad (e.g., pad 144) configured to act as a vibration isolation pad. A supported pipe may rest on the Fabreeka pad and may be held in place using at least one coated U-bolt (e.g., coupler 140) configured to bolt in place through holes that are drilled in the top plate. Structural tubing (e.g., rod sleeve 136) may be welded to the bottom of the top plate. A threaded shaft (e.g., adjustment rod) may be inserted into the structural tubing and the base of the top plate may rest on the head of the threaded shaft. The opposite end of the threaded shaft may be screwed into a tapped slug (e.g., threaded slug 114) that is welded into the top of the base of the pipe support consisting of a piece of structural tubing. The shaft position can be adjusted by tightening or loosening the threaded shaft into the tapped slug. This results in an adjustment of the height of the top plate and supported pipe to the necessary level. The base (e.g., base plate 120) of the structural tubing can be welded to structural steel, attached to a concrete pad, or fitted with a base plate. A VersaSkid base plate can be welded to the base of the stand allowing the support to be bolted into place on a VersaSkid structural skid.

The size of the pipe to be supported may determine the size of the top plate, the coated U-bolts, the structural tubing, and/or the threaded shaft to be used. The threaded shaft may allow height adjustment of the pipe support to several inches and might only be limited to the size of the threaded shaft. The length of the structural tubing can be adjusted as needed to increase the height of the support as well.

One or more surfaces of the pipe support may be treated, coated, or include appropriate metals to prevent corrosion and allow the threaded shaft to be adjusted by tightening or loosening through the tapped round. The treated surfaces may include, but are not limited to, galvanizing, painting, and Xylan coating. Materials of the pipe support may include, but are not limited to, carbon steel and stainless steel.

Figure 3:
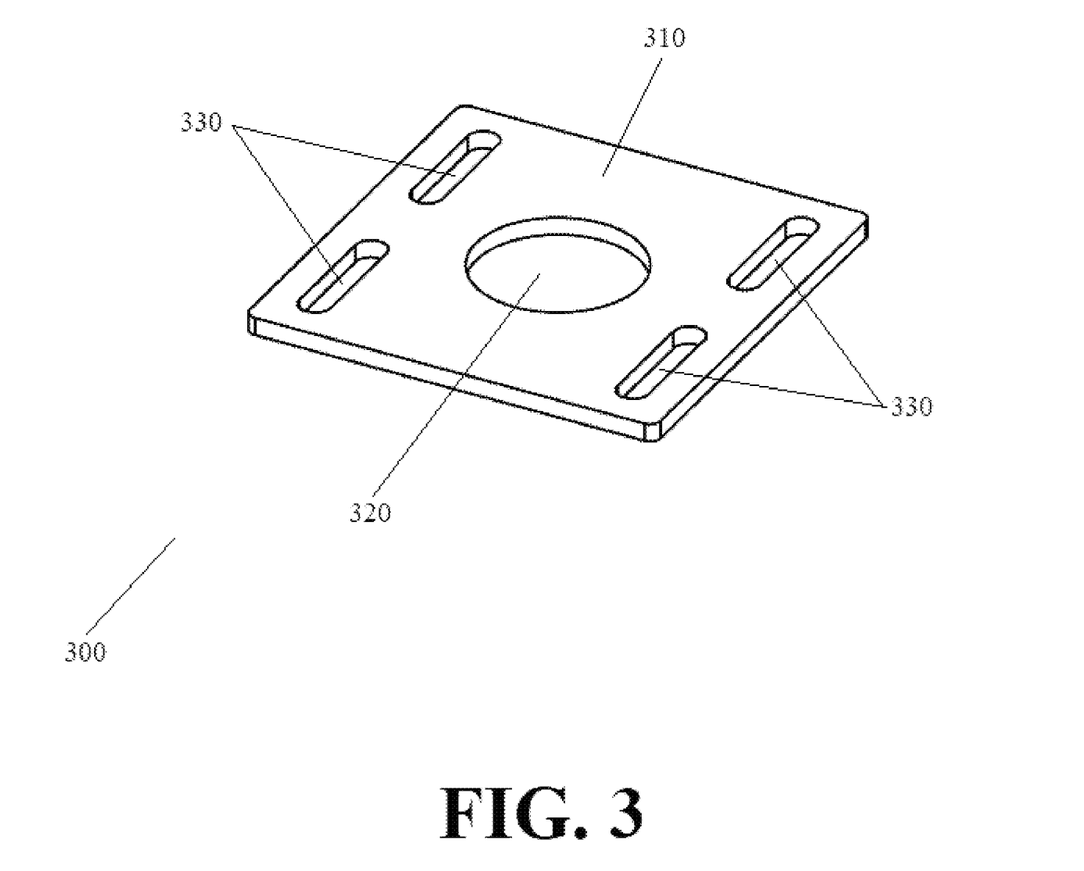
FIG. 3 illustrates a raised perspective view of an exemplary embodiment of an adjustable base plate according to aspects of the present disclosure

FIG. 3 illustrates a raised perspective view of an exemplary embodiment of an adjustable base plate according to aspects of the present disclosure. The base plate 120 described herein may include one or more coupling locations 122. Additionally or alternatively, an adjustable base plate 300 may include one or more slotted coupling sections 330. The adjustable base plate 300 includes a body 310, a connection location 320, and at least one slotted coupling section 330. At least one slotted coupling section 330 may be configured to couple to a surface and/or skid (e.g., a skid 1000 described herein) using one or more fasteners 510. A slotted coupling section 330 may be a through hole or other absence of material permitting the adjustable base plate 300 to be coupled to an external element, such as a skid pad. Additionally or alternatively, at least one slotted coupling section 330 may include a fastener or other element (not illustrated in FIG. 3) configured to permit fastening of the adjustable base plate 300 to one or more external elements. In one exemplary embodiment, the body 300 may include a plurality of slotted coupling sections 330 spaced at a same or variable distance apart from one another. In one embodiment, a slotted coupling section 330 may include a three inch longitudinal opening, although any sized opening capable of use with a fastener (e.g., fastener 510) may be used without departing from the spirit and scope of the present disclosure.

Figure 4:
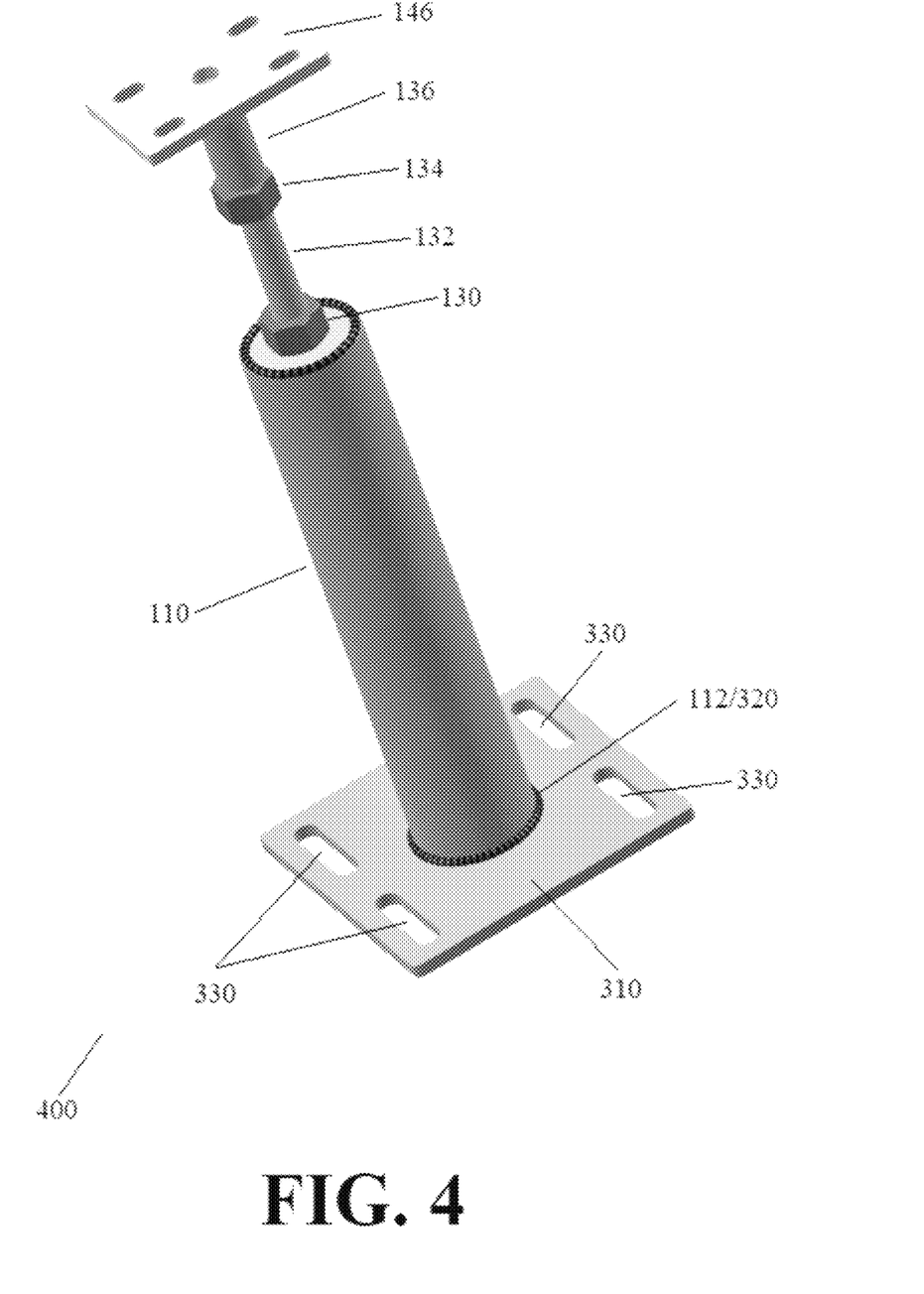
FIG. 4 illustrates a raised perspective view of a support having an adjustable base plate of FIG. 3 according to aspects of the present disclosure.

FIG. 4 illustrates a raised perspective view of a support having an adjustable base plate of FIG. 3 according to aspects of the present disclosure. The adjustable base plate 300 may be coupled to the connection location 112 of a support, such as the support 100. The adjustable support 400 may be configured to couple to at least one external element, such as a skid, a concrete pad, or other element capable of permanently or temporarily being coupled to or with a support 400. During use, a user may couple at least a portion of the adjustable base plate 300 to a skid, such as described herein with reference to FIG. 10 and skid 1000. The adjustable base plate 300 may be configured to permit movement or adjustment of an adjustable support 400 during installation and/or use, for example by loosening or disconnecting one or more fastener 510.

Figure 5:
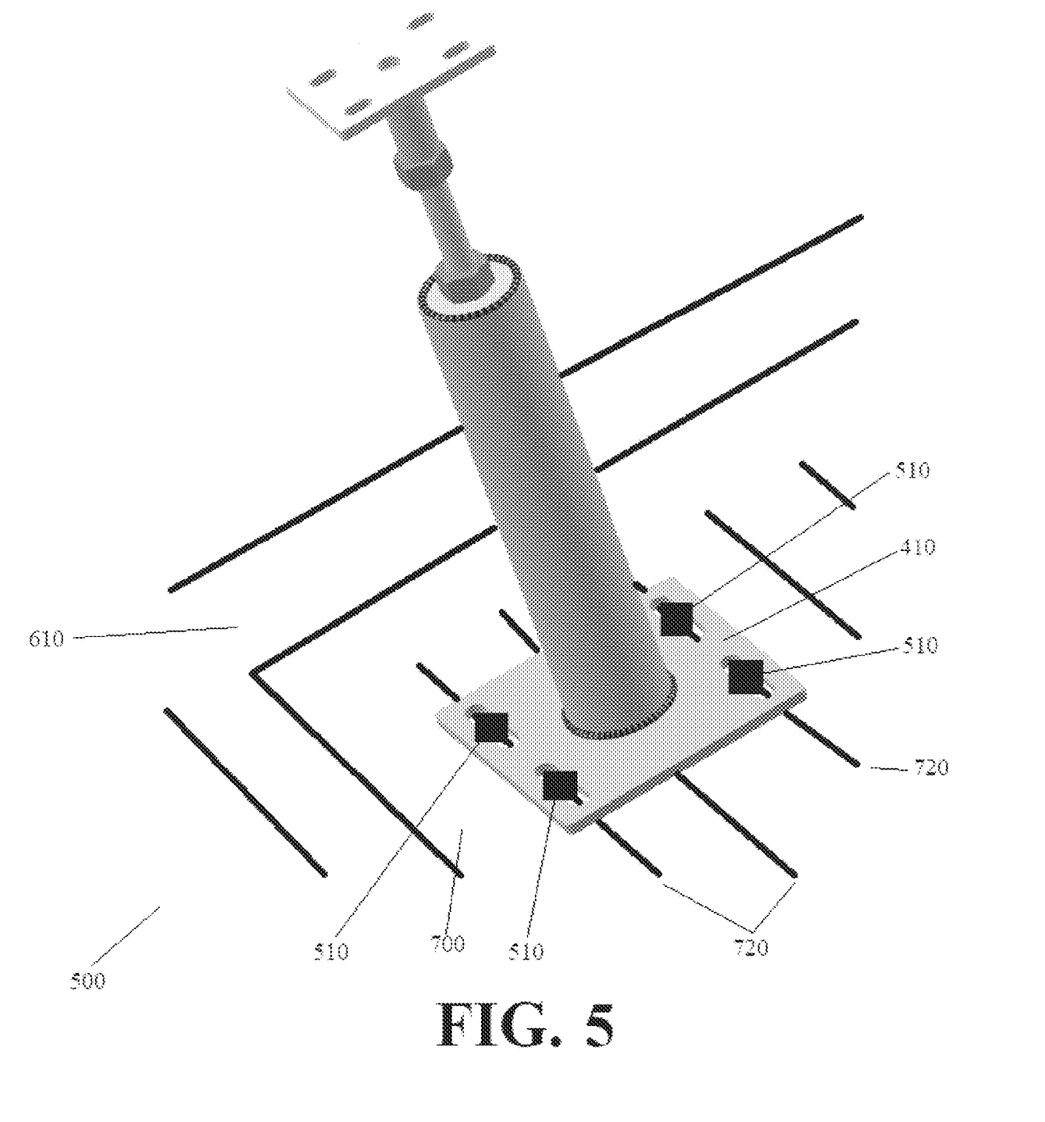
FIG. 5 illustrates a partial raised perspective view of an adjustable support coupled to a skid according to aspects of the present disclosure.

FIG. 5 illustrates a partial raised perspective view of an adjustable support coupled to a skid according to aspects of the present disclosure. The system 500 includes an adjustable support 400 coupled to a skid, for example at a skid plate 700 thereof. One or more fasteners 510 may be used to couple at least a portion of an adjustable support 400 to the skid, for example via one or more skid slots 220 of the skid plate 700. In various embodiments, a screw, nut, or other type of fastener may be used as a fastener 510 without departing from the spirit and scope of the present disclosure.

Figure 6:
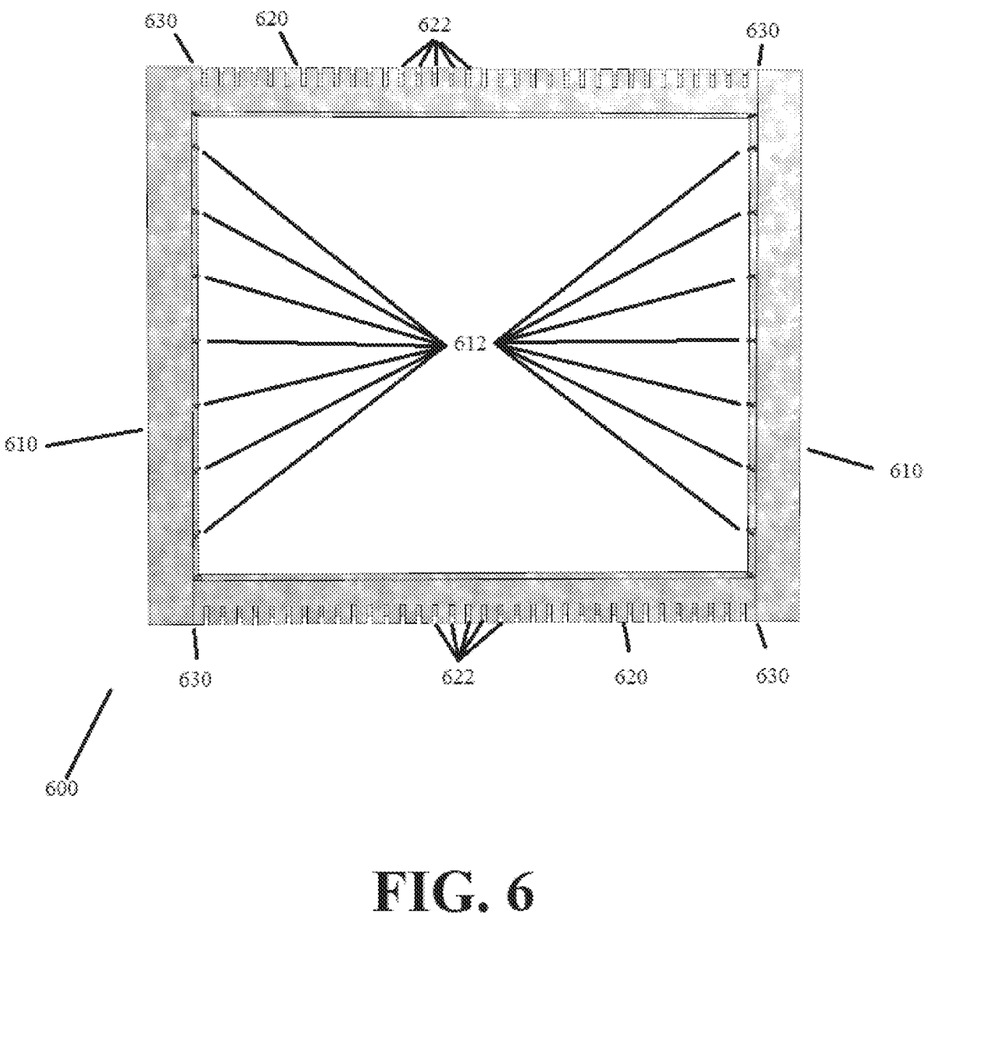
FIG. 6 illustrates a partial view of an exemplary embodiment of a skid frame according to aspects of the present disclosure.

FIG. 6 illustrates an exemplary embodiment of a partial view of a skid frame according to aspects of the present disclosure. The skid frame 600 includes at least one lateral member 610 coupled to at least one side member 620 at a coupling location 630. The lateral member 610 may include a top and a bottom surface (e.g., top surface visible in FIG. 6, coupled to one another by at least one lateral support 612. In one exemplary embodiment, at least one lateral support 612 may be coupled between the top and bottom surfaces in a substantially parallel configuration, although any interconnection configuration may be used in various embodiments. The side member 620 may include at least one side slot 622. One or more side slots 622 may be configured to couple to at least one element or to receive at least a portion of one or more elements. At least one lateral member 610 and/or side member 620 may be, either in whole or in part, made of metal, plastic, rubber, or any other material or combination of materials which provide sufficient rigidity and/or malleability consistent with the present disclosure. One or more connectors 614 may be used to fasten one or more elements of a skid 1000 and/or to couple two or more skids 1000 together.

Although described with reference to a coupling location 630, it should be appreciated that at least one coupling location 630 may include any permanent, temporary, and/or semi-permanent coupled or coupleable connection between at least one lateral member 610 and at least one lateral support 620. At least one lateral member 610 and/or lateral support 620 may be an I-beam in an exemplary embodiment. In various embodiments, at least one lateral member 610 may be coupled to at least one side member 620 by a fixed or fixable connection. For example, in various embodiments, at least one lateral member 610 may be coupled to at least one side member 620 via one or more welded coupling, bolted coupling, screwed coupling, or any other means of coupling.

Figure 7:
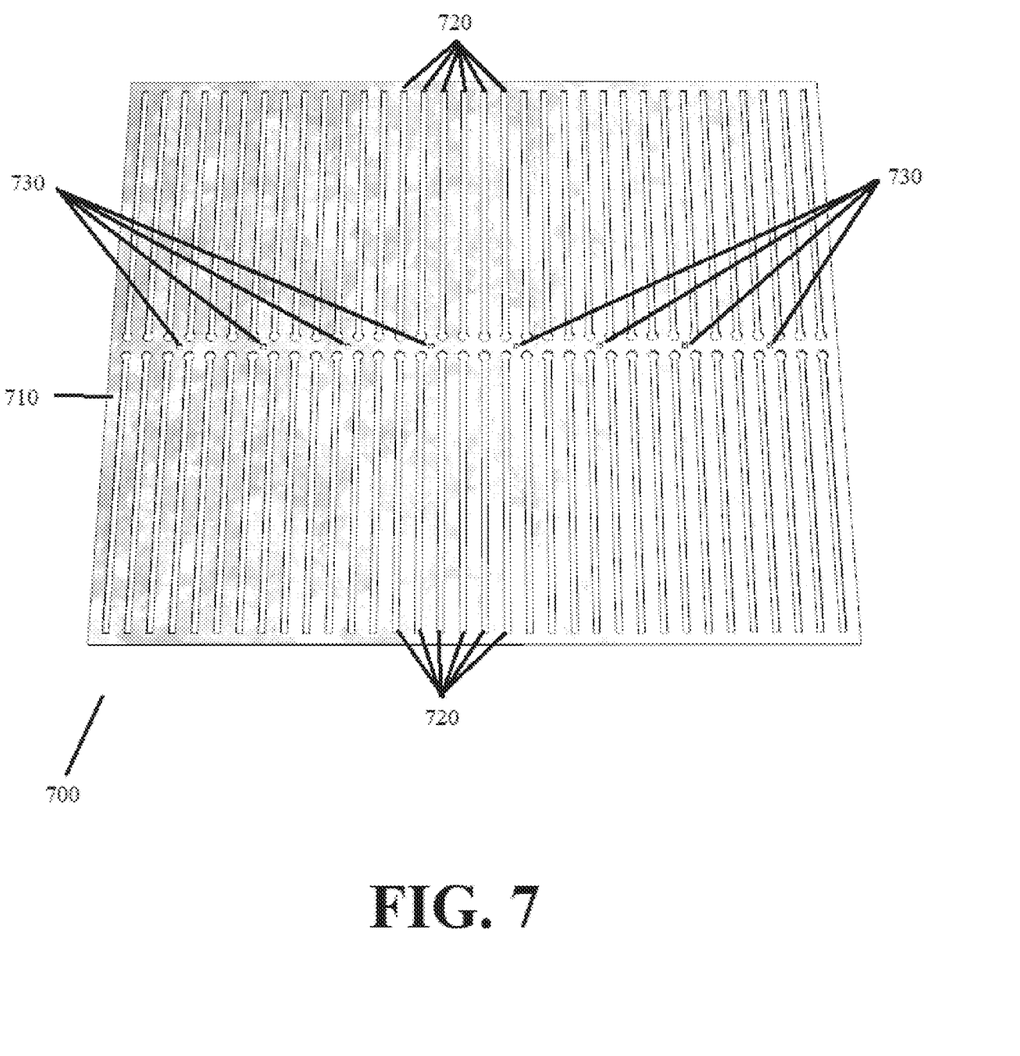
FIG. 7 illustrates an exemplary embodiment of a skid plate according to aspects of the present disclosure.

FIG. 7 illustrates an exemplary embodiment of a skid plate according to aspects of the present disclosure. A skid plate 700 includes a skid surface 710. The skid surface 710 illustrated by FIG. 7 is a top surface, but it should be appreciated that the skid surface 710 may be any surface of the skid plate 700 without departing from the spirit and the scope of the present disclosure. At least a portion of the skid plate 700 may be, either in whole or in part, made of metal, plastic, rubber, or any other material or combination of materials which provide sufficient rigidity and/or malleability consistent with the present disclosure. At least one skid slot 720 extends through a body of the skid plate 700. The number, size, and/or shape of at least one skid slot 720 may vary from the configuration illustrated by FIG. 7, which is merely exemplary.

The skid plate 700 may include at least one skid opening 730. The skid opening 730 may extend through a body of the skid plate 700 and may be configured to couple to at least one other element of the skid plate 700. The skid plate 700 may be configured to couple to at least one of the lateral member 610 and/or the side member 620 (e.g., at a top surface thereof, as illustrated by FIG. 10).

Figure 8:
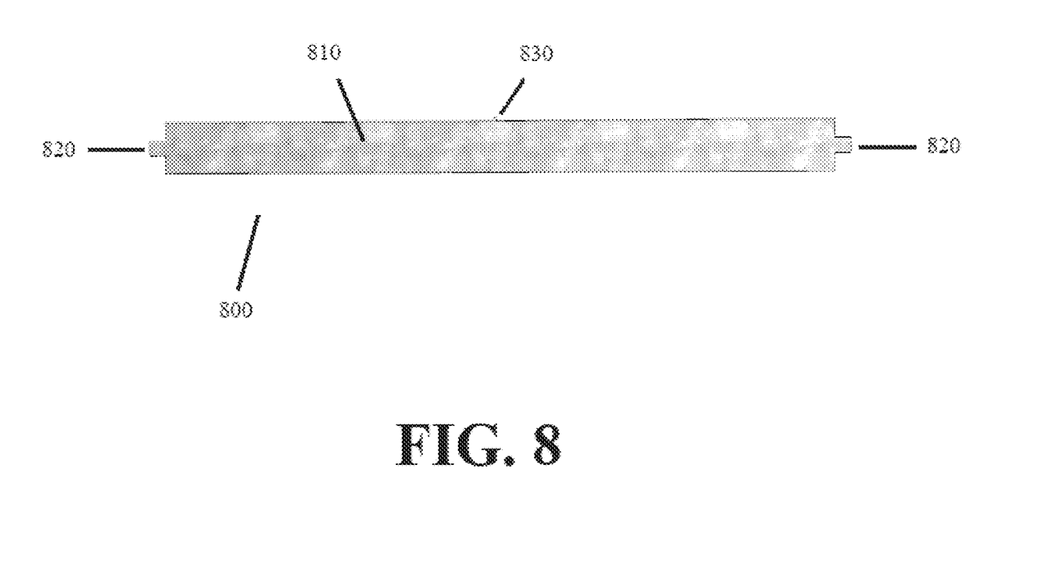
FIG. 8 illustrates an exemplary embodiment of a skid slat according to aspects of the present disclosure.

FIG. 8 illustrates an exemplary embodiment of a skid slat according to aspects of the present disclosure. The skid slat 800 includes a body 810. One or more couplers 820 may extend outwardly from the body 810. Although illustrated as extending outwardly, it should be appreciated that one or more couplers 820 may extend inwardly into the body 810 of the skid slat 800. At least one coupler 820 may be configured to couple the skid slat 800 to at least one of the lateral member 610 and/or the side member 620 (e.g. at an opening thereof). The skid slat 800 may further include at least one notch 830. The notch 830 is configured in one exemplary embodiment to extend through at least a portion of a skid opening 730 of a skid plate 700. Additionally or alternatively, the notch 830 may include or be replaced at least in part by an adhesive or other fastening or coupling element capable of coupling to a skid plate 700. At least a portion of the skid slat 800 may be, either in whole or in part, made of metal, plastic, rubber, or any other material or combination of materials which provide sufficient rigidity and/or malleability consistent with the present disclosure.

Figure 9:
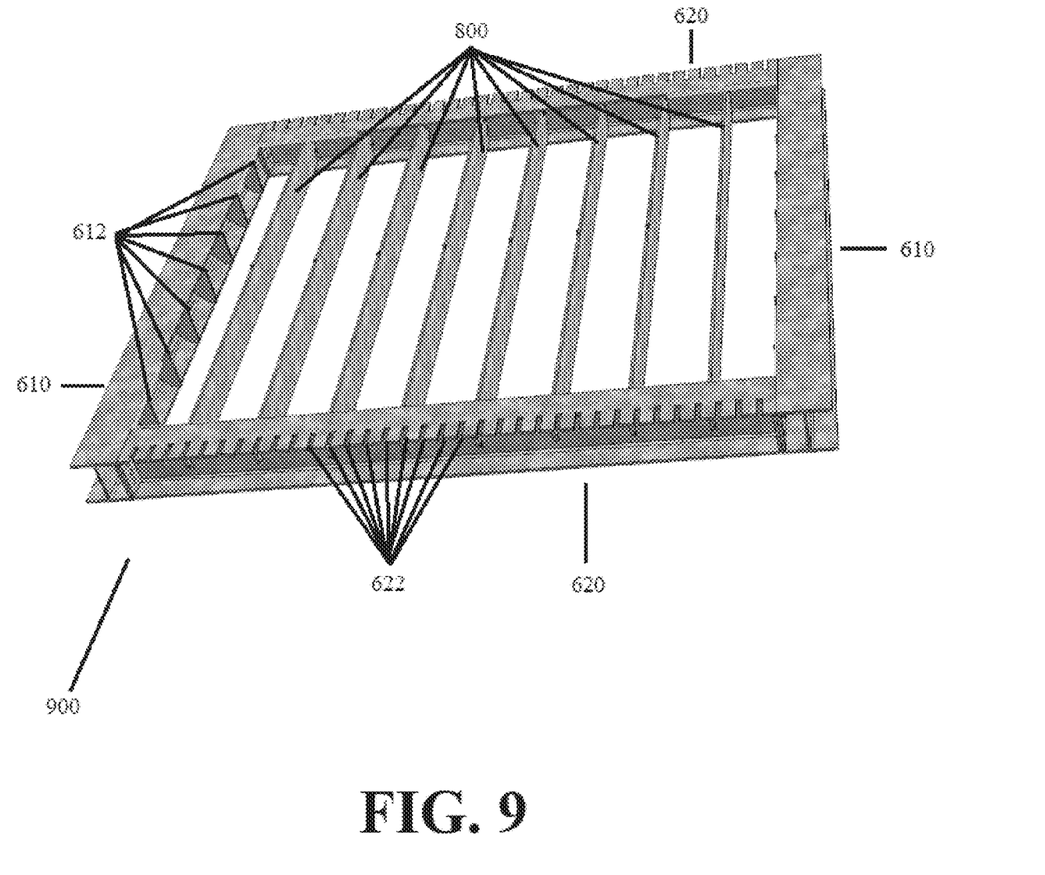
FIG. 9 illustrates a partial raised perspective view of an exemplary embodiment of a partial skid assembly according to aspects of the present disclosure.

FIG. 9 illustrates an exemplary embodiment of a partial raised perspective view of a partial skid assembly according to aspects of the present disclosure. The partial skid assembly 900 includes two lateral members 610 coupled to two side members 620. A plurality of skid slats 800 are coupled between the two side members 620. At least a portion of the skid slats 800 may be received at one or more openings or receiving areas (e.g., side slot 622) along a portion of the side members 620. In one exemplary embodiment, each side member 620 is an I-beam having a plurality of openings along a longitudinal length of the side member 620, the plurality of openings configured to receive at least a portion of a coupler 820 of a skid slat 800. Although illustrated with reference to FIG. 9 as being at the side member 620, it should be appreciated that at least one side slot 622 of the side member 620 may be replaced by or used in conjunction with at least one side slot located within at least one lateral member 610.

Figure 10:
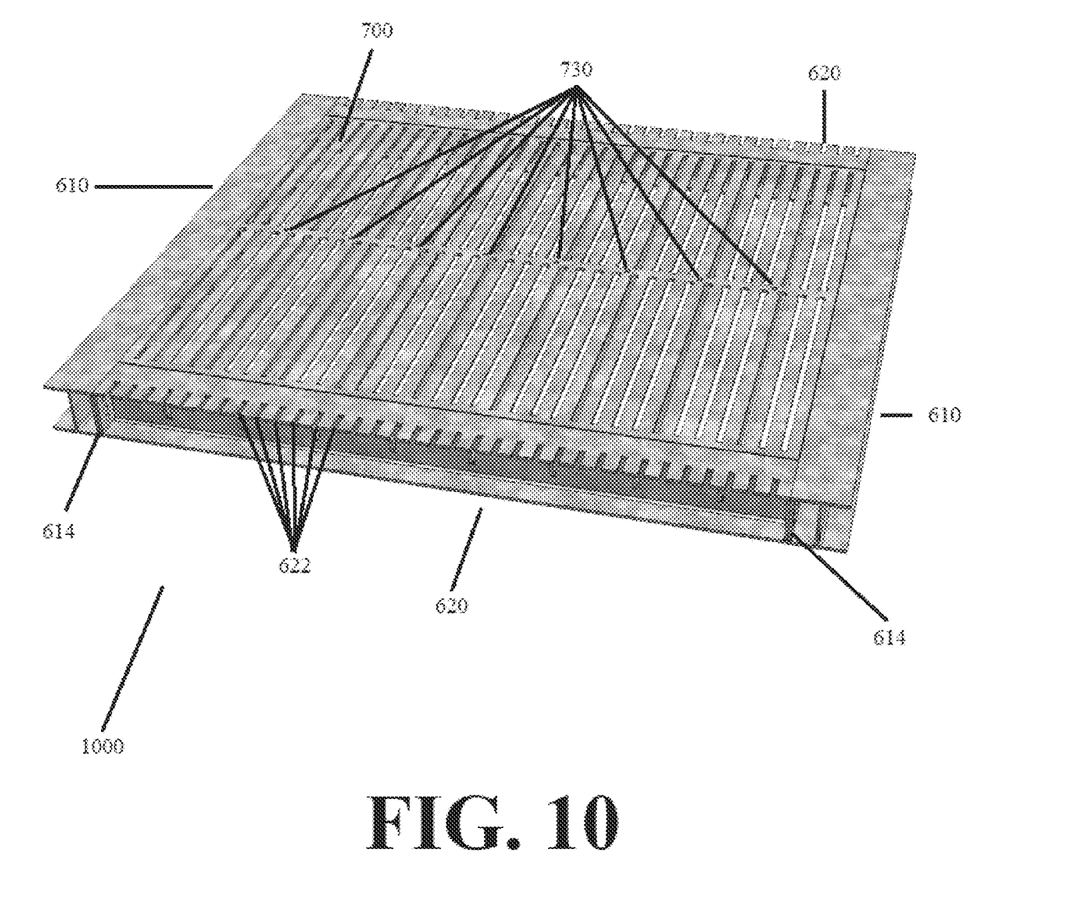
FIG. 10 illustrates a raised perspective view of an exemplary embodiment of a skid according to aspects of the present disclosure

FIG. 10 illustrates an exemplary embodiment of a raised perspective view of a skid according to aspects of the present disclosure. The skid 1000 illustrated in FIG. 5 corresponds to a partial skid assembly 900 of FIG. 9 having a skid plate 700 at a top surface thereof. At least one notch 830 optionally extends at least partially through a skid opening 730 when the skid plate 700 is provided. In the embodiment illustrated by FIG. 10, eight skid openings are present on the skid plate 700 and receive a corresponding notch from eight skid slats coupled between two side members 620.

In many implementations, the frame of a skid includes four I-beams (e.g., two lateral members 610 and two side members 620). The top outside flanges of the two side members 620 are notched at equal distances for the entire length of the beam (e.g., as side slots 622). The side slots 622 are on the outside portion of the flange from the edge to the beginning of the web. A beam connector plate is coupled (e.g., welded in place) at both ends of the lateral member(s) 610 and side member(s) 620. Two additional beam connector plates are optionally coupled (e.g., welded in place) to each lateral I-beam (e.g., side member 620) in parallel with the lateral I-beams and in conjunction with the beam connectors (e.g., at an opening configured to receive at least a portion of a skid slat 800) located on the longitudinal beams. The longitudinal and lateral I-beams (i.e., lateral member 610 and side member 620) may be connected by bolting the I-beam connector plates together creating the frame of the skid. Support slats may be cut from steel plate in an exemplary embodiment.

Tabs may be cut or pre-formed in both ends and on the top of the support slat (e.g., forming the couplers 820 and notch 830 illustrated by FIG. 8). Support slats may run parallel with the lateral I-beams and the face of the slat is may be a perpendicular orientation. The slats may be held in place by sliding tabs through notches that have been cut in the lateral I-beams and the top plate. The top plate may rest on the support slats and inside the I-beam frame. Additional tabs may be coupled (e.g., welded on) to the lateral I-beams inside the flanges to provide another point of support for the top plate at both ends of the VersaSkid.

The top plate of the skid may be a steel plate with lateral channels cut to correspond to the channels in the longitudinal beams. The lateral channels may begin at a set distance from the edge of the top plate and run to the middle of the top plate from both longitudinal beams, where they are terminated into holes cut on each side of the center line of the top plate. The center of each hole may be a set distance apart from the hole of the corresponding channel on the opposite side of the center line. Round cuts may allow the head of a carriage bolt or other fastening element to be inserted into the channel and to slide horizontally across the skid plate. The channels in the top plate and longitudinal I-beams may create a grid that allows equipment and skid products fitted with one or more base plates to be secured (e.g., bolted) in place.

The skid base plate may include holes corresponding to the channels in the longitudinal I-beams and the top plate.

The plates can be manufactured in various sizes to meet the requirements of the equipment being bolted in place. Carriage bolts may be used to fasten equipment into place and can easily be adjusted in the field by loosening the appropriate nuts, re-positioning equipment as needed, and then re-tightening the nuts and securing the equipment in place.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A support apparatus comprising:
 a base including a threaded slug therein;
 a pad plate;
 a rod sleeve coupled to the pad plate;
 an adjustment rod coupled between the base and the rod sleeve, at least a portion of the adjustment rod being threadedly receivable by the rod sleeve and the threaded slug, the adjustment rod coupling the base and the pad plate, wherein a rotational movement of the adjustment rod is configured to adjust a distance between the base and the pad plate; and
 a base plate coupled to the base, the base plate configured to couple to an external element,
 wherein the base plate includes at least one slotted coupling section, the at least one slotted coupling section configured to correspond with at least one opening of the external element, and further wherein the external element is a skid.

2. The support apparatus of claim 1, further comprising:
 a pad coupled to the pad plate, the pad configured to restrict or inhibit at least one of motion or vibration of an element in contact with the pad.

3. The support apparatus of claim 1, wherein the pad plate comprises a plurality of through holes, the plurality of through holes configured to receive at least a portion of at least one coupler.

4. The support apparatus of claim 3, wherein the at least one coupler is configured to be placed in contact between both a pipe and the pad plate.

5. The support apparatus of claim 1, wherein the support apparatus is configured to couple to the external element using a fastener extending through the at least one slotted coupling section and the at least one opening of the external element.

6. The support apparatus of claim 1, wherein the at least one slotted coupling section is configured to correspond to at least one skid slot of the skid.

7. A system for providing adjustable support, comprising:
 a skid including a skid plate having at least one skid slot therethrough; and
 a support apparatus coupleable to the skid, the support apparatus including,
 a base including a threaded slug therein;
 a pad plate;
 a rod sleeve coupled to the pad plate;
 an adjustment rod coupled between the base and the rod sleeve, at least a portion of the adjustment rod being threadedly receivable by the rod sleeve and the threaded slug, the adjustment rod coupling the base and the pad plate, wherein a rotational movement of the adjustment rod is configured to adjust a distance between the base and the pad plate; and
 a base plate coupled to the base, the base plate configured to couple to the skid.

8. The system of claim 7, wherein the support apparatus further includes a pad coupled to the pad plate, the pad configured to restrict or inhibit at least one of motion or vibration of an element in contact with the pad.

9. The system of claim 7, wherein the pad plate comprises a plurality of through holes, the plurality of through holes configured to receive at least a portion of at least one coupler.

10. The system of claim 9, wherein the at least one coupler is configured to be placed in contact between both a pipe and the pad plate.

11. The system of claim 7, wherein the base plate includes at least one slotted coupling section, the at least one slotted coupling section configured to correspond with the at least one skid slot.

12. The system of claim 11, wherein the support apparatus is configured to couple to the skid using a fastener extending through the at least one slotted coupling section and the at least one skid slot.

* * * * *